(12) United States Patent
Lopez et al.

(10) Patent No.: US 11,778,560 B2
(45) Date of Patent: Oct. 3, 2023

(54) AVOIDING FALSE DETECTION ASSOCIATED WITH WAKE-UP SIGNAL

(71) Applicant: Telefonaktiebolaget LM Ericsson (publ), Stockholm (SE)

(72) Inventors: Miguel Lopez, Solna (SE); Leif Wilhelmsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/619,369

(22) PCT Filed: Jun. 2, 2020

(86) PCT No.: PCT/EP2020/065192
§ 371 (c)(1),
(2) Date: Dec. 15, 2021

(87) PCT Pub. No.: WO2021/004697
PCT Pub. Date: Jan. 14, 2021

(65) Prior Publication Data
US 2022/0264458 A1 Aug. 18, 2022

Related U.S. Application Data

(60) Provisional application No. 62/872,343, filed on Jul. 10, 2019.

(51) Int. Cl.
*H04W 52/02* (2009.01)
*H04L 27/02* (2006.01)
*H04L 27/26* (2006.01)

(52) U.S. Cl.
CPC ......... *H04W 52/0229* (2013.01); *H04L 27/02* (2013.01); *H04L 27/2628* (2013.01); *H04L 27/2697* (2013.01)

(58) Field of Classification Search
CPC . H04L 27/02; H04L 27/2628; H04L 27/2697; H04L 27/2663; H04L 27/2602;
(Continued)

(56) References Cited

U.S. PATENT DOCUMENTS 7,145,955 B1 * 12/2006 Bohnke ............... H04L 27/262
375/343
2016/0269054 A1 * 9/2016 Kim .................... H04B 1/04
(Continued)

FOREIGN PATENT DOCUMENTS

| JP | 2000341244 A | 12/2000 |
|---|---|---|
| WO | 2019001845 A1 | 1/2019 |
| WO | 2019048248 A1 | 3/2019 |

OTHER PUBLICATIONS

"A New Hybrid Frequency-Amplitude Diversity Technique for Multicarrier On-Off Keying Transmission"; Alsusa et al.; 2007 IEEE Wireless Communications and Networking Conference; Mar. 11-15, 2007 date of conference (Year: 2007).*
(Continued)

*Primary Examiner* — Benjamin H Elliott, IV
(74) *Attorney, Agent, or Firm* — Murphy, Bilak & Homiller, PLLC

(57) ABSTRACT

A method for a wireless transmitter is disclosed. The method comprises transmitting a wake-up signal over a frequency range during a time interval by transmitting a first signal part over a first frequency interval within the frequency range during the time interval and transmitting a second signal part over a second frequency interval within the frequency range during the time interval. The first and second frequency intervals are non-overlapping. The first signal part has a first auto-correlation value, and the second signal part is specifically constructed to provide a second autocorrelation value of the signal comprising the first and second signal parts which is lower than the first auto-correlation value. The
(Continued)

invention to solve the problem of false detection of an MC-OOK modulated wake-up signal in an IEEE 802.11 system using OFDM.

21 Claims, 6 Drawing Sheets

(58) Field of Classification Search
CPC . H04L 27/2613; H04L 27/2688; H04L 27/34; H04W 52/0229; H04W 68/02; H04W 84/12; H04W 72/0446; H04W 72/0453; Y02D 30/70
See application file for complete search history.

(56) References Cited

U.S. PATENT DOCUMENTS

| | | | |
|---|---|---|---|
| 2018/0019902 A1* | 1/2018 | Suh | H04L 27/2607 |
| 2018/0103431 A1* | 4/2018 | Suh | H04B 1/707 |
| 2018/0152333 A1* | 5/2018 | Shellhammer | H04L 27/2697 |
| 2018/0206192 A1* | 7/2018 | Vermani | H04L 27/2613 |
| 2018/0376370 A1* | 12/2018 | Shellhammer | H04L 27/2613 |
| 2019/0036754 A1* | 1/2019 | Lee | H04W 52/0229 |
| 2019/0116555 A1* | 4/2019 | Kristem | H04L 5/0092 |
| 2019/0289549 A1* | 9/2019 | Lim | H04W 52/0219 |
| 2019/0306797 A1* | 10/2019 | Azizi | H04L 5/0053 |
| 2019/0342828 A1* | 11/2019 | Shellhammer | H04L 27/2627 |
| 2020/0322889 A1* | 10/2020 | Chitrakar | H04W 52/0235 |
| 2022/0060986 A1* | 2/2022 | Tie | H04W 52/0232 |
| 2022/0095228 A1* | 3/2022 | Sahin | H04L 27/02 |
| 2022/0264458 A1* | 8/2022 | Lopez | H04L 27/02 |

OTHER PUBLICATIONS

"Partial On-Off Keying—A Simple Means to Further Improve IoT Performance"; Sundman et al.; 2018 Global Internet of Things Summit (GIoTS) (Year: 2018).*

"Spectrum efficient support of Wake-Up Receivers by Using (O)FDMA"; Wilhelmsson et al.; 2018 IEEE Wireless Communications and Networking Conference (WCNC) (Year: 2018).*

"Transmitter Techniques for Multi-Carrier On-Off Keying"; Lopez et al.; ICC 2019—2019 IEEE International Conference on Communications (ICC) (Year: 2019).*

"Ultra Low Power Wake-Up Radios: A Hardware and Networking Survey"; Piyare et al.; IEEE Communications Surveys & Tutorials, vol. 19, No. 4, Fourth Quarter 2017 (Year: 2017).*

"CR for Examples of WUR MC-OOK Symbol Design and CSD Design in Annex AB", IEEE P802.11, Wireless LANs, doc.: IEEE 802.11-18/2000r1, Nov. 2018, pp. 1-5.

Huang, Po-Kai, "Comments on TGba/D3.0", IEEE P802.11 Wireless LANs, doc.: IEEE 802.11-yy/xxxxr0, Jun. 24, 2019, pp. 1-342.

Lopez, Miguel, "Study of False L-STF Detections Triggered by MC-OOK", doc.: IEEE 802.11-19/1178rO, Jul. 9, 2019, pp. 1-10.

* cited by examiner

AVOIDING FALSE DETECTION ASSOCIATED WITH WAKE-UP SIGNAL

TECHNICAL FIELD

The present disclosure relates generally to the field of wireless communication. More particularly, it relates to wake-up signaling in wireless communication systems.

BACKGROUND

Some wireless communication systems support devices with ultra-low power consumption. Examples of such devices include small sensor nodes where a battery should last many years and/or where energy scavenging is used to achieve battery-less operation.

When the wireless communication systems are to communicate with such devices, a receiver needs be active in the device; and to achieve a certain response time the receiver may need to be operated regularly. For devices with ultra-low power consumption, the power consumption of such a regularly operated receiver needs to be low.

An ultra-low power receiver specifically dedicated for this purpose (a so-called wake-up receiver—WUR—sometimes also referred to as a wake-up radio) is often used to meet the above requirements. The capabilities of the wake-up receiver are limited, and it typically is only able to detect presence of a wake-up signal (WUS) and initiate operation of another receiver responsive to wake-up signal detection. Hence, a WUR may generally be based on a very relaxed implementation architecture, since it is typically not purposed to be used for any data reception.

Thus, wake-up receivers typically provide a means to significantly reduce the power consumption for wireless communication receiver nodes. The other receiver (which may be denoted as a default receiver of a main receiver) is typically a receiver with more capabilities (i.e., able to receive the actual communication) and higher power consumption.

Typically, a wake-up signal (WUS) may be defined as a signal with the (possibly sole) purpose of being reliably detected by a wake-up receiver (WUR) for causing the WUR to wake-up a more advanced (e.g., default/main) receiver in the device comprising the WUR. A WUS may be designed in as comprising one or more WUS packets, or wake-up packets (WUP).

A commonly used modulation for the WUS/WUP is on-off keying (OOK), which is a binary modulation where a logical one is represented by sending a (any) signal (ON) and a logical zero is represented by not sending any signal (OFF); or vice versa.

FIG. 1 schematically illustrates an example apparatus 100 (e.g., a receiver node) comprising a WUR 120 and another, more advanced, receiver (REC) 110. The WUR and the more advanced receiver may share the same antenna(s) as illustrated in FIG. 1. When the WUR is operational and monitoring reception of a WUP, the more advanced receiver (e.g., provided on chipset separate from the WUR) can be switched off to preserve power.

One example application of WUR and WUS relates to current activities in the IEEE802.11 task group (TG) IEEE 802.11ba, aiming to standardize the physical (PHY) and medium access control (MAC) layers for a WUR that is purposed to be used as a companion receiver/radio to an IEEE802.11 primary communications radio (PCR) to provide significantly reduced power consumption.

In IEEE802.11ba, the WUP is termed wake-up radio physical layer procedure convergence protocol data unit (WUR PPDU).

It is proposed in IEEE802.11ba to support two data rates, a low data rate (LDR) and a high data rate (HDR). Embodiments herein may be equally applicable for LDR and HDR, even though LDR will be used as an illustrative example.

In IEEE802.11ba, it is proposed to apply Manchester coding and repetition coding to the part of the WUP carrying the WUS data and then OOK modulation.

In Manchester coding, a logical zero is encoded as "10" and a logical one is encoded as "01"; or vice versa. Therefore, every transmitted WUS data symbol will have both an "ON" part (where there is transmitted signal energy) and an "OFF" part (where there is no transmitted signal energy); but in different order depending on the WUS data symbol value.

In an example repetition coding scheme, a logical zero is encoded as "00" and a logical one as "11".

Using a combination of Manchester coding and repetition coding may result in that a logical zero is encoded as "1010" and that a logical one is encoded as "0101".

It is also proposed in IEEE802.11ba to generate the WUP by utilizing an inverse fast Fourier transform (IFFT), which is beneficial since such a processing block is already available in Wi-Fi transmitters supporting, e.g., IEEE802.11a/g/n/ac. This particular IFFT is a 64-point FFT and operates at a sampling rate of 20 MHz.

Specifically, an approach discussed for generating the OOK of the WUP is to use the 13 sub-carriers in the center of the OFDM-signal (corresponding to approximately 4 MHz bandwidth); populating these sub-carriers with some signal to represent "ON" and not transmitting anything at all to represent "OFF". Thus, multiple carriers are used to generate the "ON" part and this OOK scheme (as being standardized in IEEE802.11ba) is referred to as multicarrier OOK (MC-OOK). A feature of MC-OOK is that the same OFDM symbol may be (consistently) used to generate the MC-OOK signal. Thus, the same frequency domain symbols are used to populate the non-zero sub-carriers for all "ON" parts.

Using the same OFDM symbol to generate the "ON" part of every Manchester coded data symbol has some advantages. For example, simulation results have shown that, when the OFDM symbol was optimized for sensitivity performance, significant performance gains were obtained compared to if random symbols (e.g., randomly picked, different, symbols) would be used.

It is also proposed in IEEE802.11ba to randomize the OFDM symbol (e.g., letting the content of the same OFDM symbol take different forms for different transmission occasions) in order to remove spectral lines due to repeated use of the same OFDM symbol to generate the "ON" part, and to add a cyclic prefix after the IFFT operation to provide the WUP with the same orthogonal frequency division multiplexing (OFDM) symbol duration as used for IEEE802.11a/g/n/ac, and to prepend a legacy preamble to the MC-OOK signal in order to spoof legacy receivers (e.g., stations) to prevent them from accessing the medium during the WUS transmission.

The randomization of the OFDM symbol (e.g., letting the content of the same OFDM symbol take different forms for different transmission occasions) typically comprises generating an integer n between one and eight in a pseudo-random fashion, generating in a pseudo-random fashion a further integer m∈±1, looking up a delay value in a table containing eight pre-defined delays by selecting the table entry n, cyclically shifting the OFDM symbol by the lookedup delay value, and multiplying the shifted OFDM symbol by the integer m. The operations of cyclically shifting and multiplying by ±1 preserve the trajectory of the original OFDM symbol in the signal plane (i.e., the IQ-diagram remains unchanged), and thereby preserve performance and properties (e.g., peak to average power ratio—PAPR).

The pseudo-random integers n and m are typically generated by means of a linear feedback shift register with generator polynomial $G(z)=z^{-7}+z^{-4}+1$. Three bits (b0, b1, b2) are extracted from the seven memory elements in the linear feedback shift register and mapped to an integer n between one and eight, and the integer m is generated by taking the binary output of the linear feedback shift register and converting it to ±1.

Such an example WUP format is illustrated in FIG. 2. The WUS packet 200 comprises a legacy preamble 210 and a WUS part 220. The legacy preamble 210 is an OFDM signal extending over the full 20 MHz bandwidth and comprises a legacy short training field (L-STF) 201, a legacy long training field (L-LTF) 202, a legacy signal field (L-SIG) 203, and two a binary shift keying mark fields (BPSK-Mark1, BPSK-Mark2) 204, 205. The WUS part 220 is an MC-OOK signal extending over the 13 center sub-carriers of 4 MHz bandwidth and comprises a synchronization field for the WUR (WUR SYNC) 206 and a WUS data field (WUS DATA) 207.

Generally, when referred to herein a legacy receiver may be defined as one or more of:

a receiver that is not configured to recognize a WUP;

a receiver adapted for reception of IEEE802.11 packets;

a receiver adapted for reception according to any of IEEE802.11a/g/n/ac; and a receiver that is not configured to receive signals according to versions of IEEE802.11 later than any of IEEE802.11a/g/n/ac.

In the document IEEE 802.11-18/2000r1, Wireless LANs, "CR for Examples of WUR MC-OOK Symbol Design and CSD Design in Annex AB", 2018 Nov. 13 by Dennis Sundman (Ericsson), available at https://mentor.ieee.org/802.11/dcn/18/11-18-2000-01-00ba-cr-for-examples-of-wur-mc-ook-symbol-design-and-csd-design-in-annex-ab-.docx, several contributions on OFDM symbols optimized to generate MC-OOK were presented and approved for inclusion in the draft of the IEEE802.11ba standard, and are repeated in the two tables following below.

One table refers to example values for the sequence ($S_{-6,6}$) used for construction of a 2 μs MC-OOK "ON" symbol:

| Index | Sequence $S_{-6,6}$ |
|---|---|
| Example 1 | {1, 0, 1, 0, 1, 0, 0, 0, −1, 0, 1, 0, −1} |
| Example 2 | $\{3+7j, 0, 1+15j, 0, -5+13j,$ $0, 0, 0, 13-5j, 0, -15-1j, 0, 7+3j\} \over \sqrt{159.333}$ |

Note—The scaling factor has been chosen so that the MC-OOK On symbol is normalized to have the same power as the other examples.

| Example 3 | {1, 0, 1, 0, −1, 0, 0, 0, −1, 0, −1, 0, 1} |

Another table refers to example values for the sequence ($S_{-6,6}$) used for construction of a 4 μs MC-OOK "ON" symbol:

| Index | Sequence $S_{-6,6}$ |
|---|---|
| Example 1 | {1, 1, 1, −1, −1, −1, 0, −1, 1, −1, −1, 1, −1} |
| Example 2 | $\{-9-5j, -7+9j, -1+1j, 9+15j, 15-9j, -9+1j,$ $0, 1-9j, 9-15j, 15+9j, -1+1j, 9-7j, 5+9j\} \over \sqrt{155.333}$ |

Note—The scaling factor has been chosen so that the MC-OOK On symbol is normalized to have the same power as the other examples.

| Example 3 | $\frac{1+j}{\sqrt{2}}\{1, -1, 1, -1, -1, 1, 0, -1, -1, 1, 1, 1, 1\}$ |

These OFDM symbols have some characteristics in common. For example, they have low peak to average power ratio (PAPR); a signal characteristic that benefits the performance when an envelope detector is used in the WUR. Furthermore, they exhibit non-negligible autocorrelation; which has been verified experimentally for the example OFDM symbols above and can be expected also for some other OFDM symbols suitable for MC-OOK (e.g., optimizing MC-OOK performance and/or having low PAPR).

A problem which results from the non-negligible autocorrelation has been reported in the IEEE802.11 document titled "Comments on TGba/D3.0", which document is available at https://mentor.ieee.org/802.11/dcn/19/11-19-1016-03-00ba-comments-on-tgba-d3-0.xlsx, where it is stated that "receivers may false detect these WUR MC-OOK symbols as L-STF" and that "this can have a negative impact on the STA operation".

This problem relates to that an IEEE802.11 PPDU starts with a Short Training Field (STF), which consists of 10 repetitions of a 0.8 us long pattern, and legacy IEEE802.11 receivers detect packets by correlating the received signal with a received signal that is delayed by 0.8 μs; i.e., it relies on the autocorrelation properties of the signal.

Experimental tests confirm that the example MC-OOK signals in the document IEEE 802.11-18/2000r1, Wireless LANs, "CR for Examples of WUR MC-OOK Symbol Design and CSD Design in Annex AB", trigger false packet detections in legacy IEEE802.11 receivers applying the above autocorrelation detection mechanism.

In a typical example, a legacy receiver scanning the medium detects the legacy preamble at the beginning of a WUP and refrains from accessing the medium as intended by inclusion of the preamble. However, legacy receivers often keep scanning the medium even after a packet has been detected and may thereby experience new autocorrelation peak(s) relating to the MC-OOK part of the WUP. This leads to false detection, i.e., the legacy receiver believes that it has detected a new packet. Such false detections may continue throughout the duration of the MC-OOK part of the WUP since all the "ON" parts of the MC-OOK signal may possibly trigger a false detection.

The behavior of the legacy receiver in response to such false detections typically depends on the implementation. However, it is believed that false detections as described above may result in undesirable actions by the legacy receiver. Examples of such actions include, but are not limited to, that the legacy receiver may unnecessarily initiate a new packet decoding attempt for each false detection, and that the legacy receiver may declare the medium to be idle when it cannot decode the packet and prematurely start transmitting.

The false detection problem may, alternatively or additionally, affect other receivers supporting IEEE802.11ax, or even future IEEE802.11be receivers.

The false detection problem is illustrated in FIG. 3, which is a simulation plot showing normalized autocorrelation 301 for a WUP as a function of the WUP samples. The normalized autocorrelation is typically used as detection statistic in commercial legacy receivers, wherein a detection is declared when the normalized autocorrelation 301 exceeds a threshold value 300.

It should be noted that the plot of FIG. 3 does not show autocorrelation relating to the pre-able—e.g., 210 of FIG. 2—(including L-STF), but only shows autocorrelation for the MC-OOK part—e.g., 220 of FIG. 2.

The MC-OOK part of the WUP is generated utilizing the OFDM symbol of example 1 in the above table for example values for the sequence $(S_{-6,6})$ used for construction of a 4 μs MC-OOK "ON" symbol, and the input signal is noiseless resulting in a worst case scenario for the false detection problem since the presence of noise has a de-correlating effect.

Typically, the legacy receiver will detect the WUP at the beginning of the preamble as intended (not shown in FIG. 3). However, the legacy receiver will also experience a false detection during the MC-OOK part of the WUP as illustrated at 310 and 320.

One solution to the false detection problem is to generate MC-OOK using an OFDM symbol having low autocorrelation, which will mitigate triggering of false detections. However, the WUR will typically suffer significant performance degradation since there is typically a trade-off between low PAPR and low autocorrelation.

Therefore, there is a need for other solutions to avoid or mitigate false detection in relation to wake-up packets.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method for a wireless transmitter. The method comprises transmitting a signal over a frequency range during a time interval The transmission comprises transmitting a first signal part over a first frequency interval within the frequency range during the time interval, wherein the first signal part has a first autocorrelation value.

The transmission also comprises transmitting a second signal part over a second frequency interval within the frequency range during the time interval, wherein the first and second frequency intervals are non-overlapping, and wherein the second signal part is specifically constructed to provide a second autocorrelation value of the signal comprising the first and second signal parts which is lower than the first autocorrelation value.

In some embodiments, the second signal part has an exclusive purpose to provide the second autocorrelation value.

In some embodiments, the first signal part is a wake-up signal (WUS).

In some embodiments, the first signal part represents an on-state of an on-off keying (OOK) modulation scheme.

In some embodiments, the method further comprises determining the second signal part based on the first signal part.

In some embodiments, determining the second signal part comprises determining respective autocorrelation values for a plurality of hypothesized signals (each hypothesized signal comprising the first signal part and a candidate second signal part), and selecting the candidate second signal part which is associated with the lowest determined respective autocorrelation value.

In some embodiments, transmitting the signal over the frequency range during the time interval further comprises transmitting a third signal part over a third frequency interval within the frequency range during the time interval, wherein the first, second and third frequency intervals are non-overlapping, wherein the first frequency interval is located between the second and third frequency intervals, and wherein the third signal part is specifically constructed to provide a third autocorrelation value of the signal comprising the first, second, and third signal parts which is lower than the first autocorrelation value.

In some embodiments, transmitting the signal over the frequency range during the time interval further comprises refraining from transmission in a frequency guard interval between the first frequency interval and the second frequency interval.

In some embodiments, the method further comprises (for each of a plurality of time intervals) randomly picking a first or second value, multiplying the second signal part by negative one when the second value is picked, and transmitting an instantiation of the signal over the frequency range during the time interval.

In some embodiments, the first signal part represents an on-state of a multi-carrier on-off keying (MC-OOK) modulation scheme.

In some embodiments, the frequency range is defined by a collection of sub-carriers for orthogonal frequency division multiplexing (OFDM) and the first and second frequency intervals are defined by respective first and second sub-sets of the collection of sub-carriers.

In some embodiments, the method further comprises generating the signal for transmission by providing a first digital signal for generation of the first signal part at first inputs of an inverse fast Fourier transform (IFFT) wherein the first inputs correspond to the first sub-set of sub-carriers, and providing a second digital signal for generation of the second signal part at second inputs of the IFFT wherein the second inputs correspond to the second sub-set of sub-carriers.

A second aspect is an apparatus for a wireless transmitter. The apparatus comprises controlling circuitry configured to cause transmission of a signal over a frequency range during a time interval by causing transmission of a first signal part over a first frequency interval within the frequency range during the time interval, wherein the first signal part has a first autocorrelation value, and transmission of a second signal part over a second frequency interval within the frequency range during the time interval, wherein the first and second frequency intervals are non-overlapping, and wherein the second signal part is specifically constructed to provide a second autocorrelation value of the signal comprising the first and second signal parts which is lower than the first autocorrelation value.

A third aspect is a wireless transmitter comprising the apparatus of the second aspect.

A fourth aspect is a communication device comprising the apparatus of the second aspect and/or the wireless transmitter of the third aspect.

A fifth aspect is a method for a wireless receiver. The method comprises receiving a signal over a frequency range during a time interval, determining an autocorrelation value for the received signal, and (when the autocorrelation value meets a detection criterion) declaring false detection when a false detection criterion is met.

In some embodiments, the detection criterion comprises the autocorrelation value falling on a first side of a detection threshold.

In some embodiments, the false detection criterion is based on a first ratio between power of the received signal in a first frequency interval within the frequency range and power of the received signal in the frequency range.

In some embodiments, the false detection criterion comprises the first ratio falling on a first side of a first false detection threshold.

In some embodiments, the frequency range is defined by a collection of sub-carriers for orthogonal frequency division multiplexing (OFDM) and the first frequency interval is defined by a first sub-set of the collection of sub-carriers.

In some embodiments, the false detection criterion is based on a second ratio between power of the received signal in the time interval and received power in a directly preceding or subsequent time interval.

In some embodiments, the false detection criterion comprises the second ratio falling on a first side of a second false detection threshold and on a second side of a third false detection threshold.

In some embodiments, the received signal represents an on-state of an on-off keying (OOK) modulation scheme.

In some embodiments, the method further comprises (when the false detection criterion is met) one or more of refraining from further attempts to process a packet of the received signal, refraining from re-setting a network allocation vector (NAV), and refraining from transmission during the time interval.

A sixth aspect is an apparatus for a wireless receiver. The apparatus comprises controlling circuitry configured to cause reception of a signal over a frequency range during a time interval, determination of an autocorrelation value for the received signal, and (when the autocorrelation value meets a detection criterion) declaration of false detection when a false detection criterion is met.

A seventh aspect is a wireless receiver comprising the apparatus of the sixth aspect.

An eighth aspect is a communication device comprising the apparatus of the sixth aspect and/or the wireless receiver of the seventh aspect.

A ninth aspect is a computer program product comprising a non-transitory computer readable medium, having thereon a computer program comprising program instructions, the computer program being loadable into a data processing unit and configured to cause execution of the method according to any of the first and fifth aspects when the computer program is run by the data processing unit.

In some embodiments, any of the above aspects may additionally have features identical with or corresponding to any of the various features as explained above for any of the other aspects.

An advantage of some embodiments is that false detection in relation to wake-up packets is avoided or mitigated.

Another advantage of some embodiments is that the occurrence of false detection in relation to wake-up packets is decreased.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

Even though embodiments and/or the problem(s) they aim to solve are exemplified herein in the context of IEEE802.11ba, it should be understood that embodiments may be equally applicable in relation to any other scenarios where wake-up signaling occurs.

Furthermore, although generating an MC-OOK signal using an IFFT to populate 13 center sub-carriers is referred to herein, embodiments may be equally applicable for other WUS-signals and/or other ways to generate the WUS-signal.

Generally, an MC-OOK signal can be viewed as a signal wherein the occupied bandwidth of the signal is effectively decoupled from the symbol rate of the signal. The bandwidth is determined by the number of sub-carriers that is used while the symbol rate is determined by the sampling rate (and possibly by the IFFT size, when applicable). For example, the bandwidth of the signal may be roughly 4 MHz while the symbol rate may be 250 ksymbol/s, as is the case when the same OFDM symbol is used to generate an MC-OOK signal on 13 sub-carriers of a IEEE802.11 transmitter.

In the following, embodiments will be described where false detections in relation to wake-up packets is avoided or mitigated. Some embodiments may be particularly applicable for false detections caused by MC-OOK signals. The description will be in the form of some detailed examples as well as some more general embodiments.

Some embodiments relate to approaches for a transmitter of a wake-up signal, some embodiments relate to approaches for a receiver at risk of experiencing false detections in association with a wake-up signal, and some embodiments relate to combinations of one or more of the transmitter approaches and one or more of the receiver approaches.

Embodiments relating to approaches for a transmitter of a wake-up signal will now be exemplified.

Figure 4:
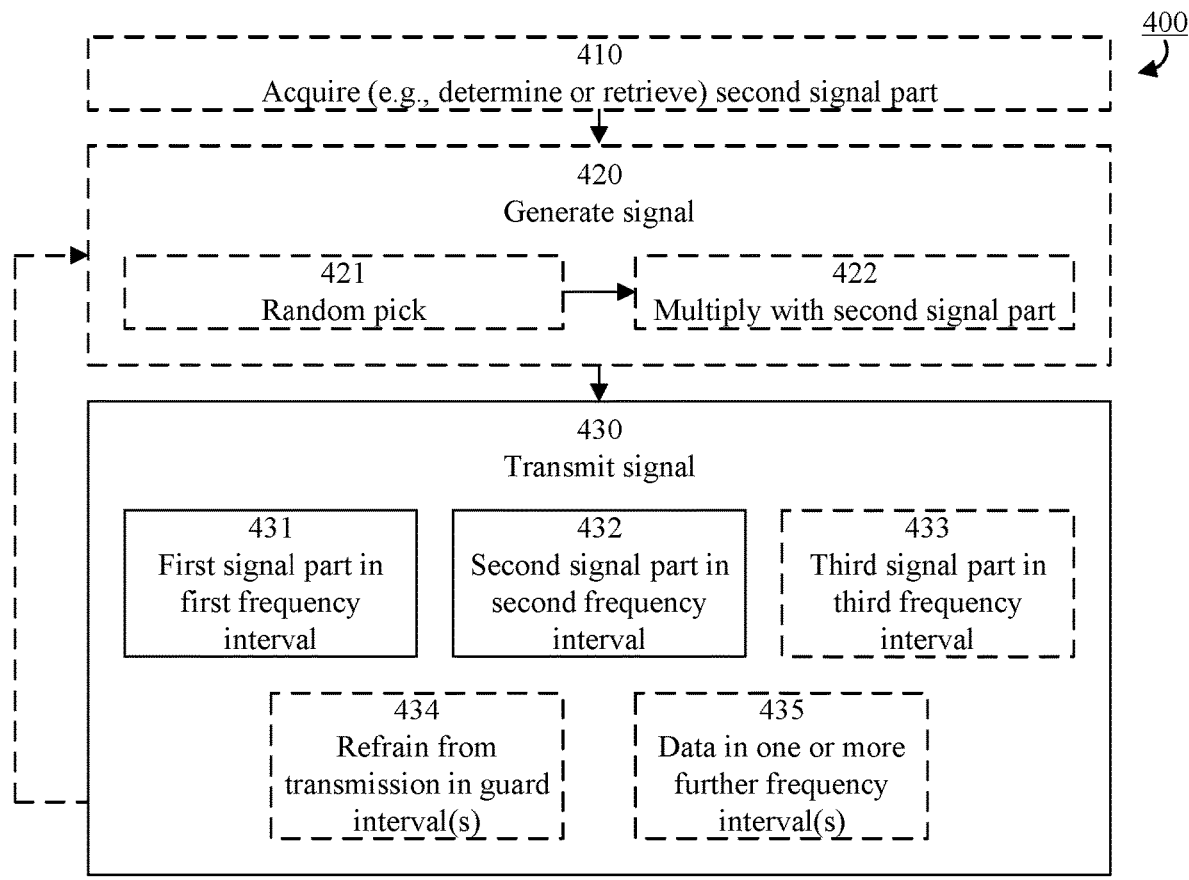
FIG. 4 is a flowchart illustrating example method steps according to some embodiments.

FIG. 4 illustrates an example method 400 for a wireless transmitter according to some embodiments. The wireless transmitter may be configured for transmission of a wake-up signal.

Figure 1:
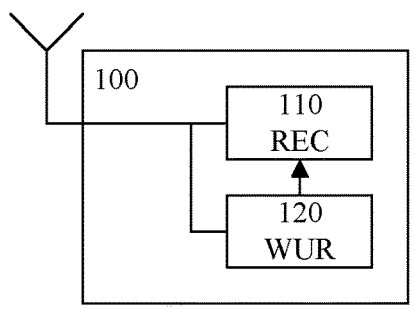
FIG. 1 is a schematic block diagram illustrating an example apparatus comprising a WUR according to some embodiments.
Figure 2:
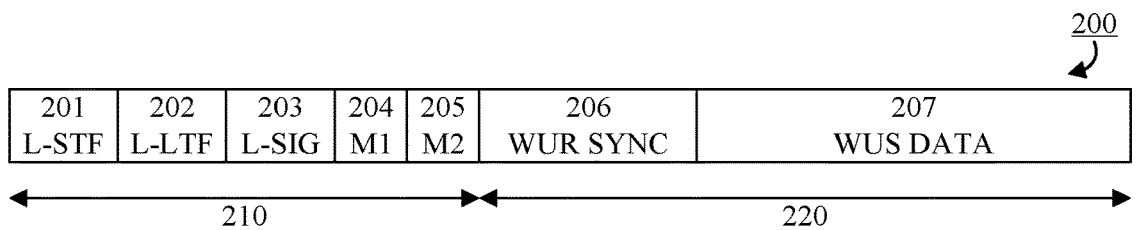
FIG. 2 is a schematic drawing illustrating an example WUS packet according to some embodiments.

Generally, the method comprises transmitting a signal over a frequency range (e.g., 20 MHz in the example of IEEE802.11) during a time interval (e.g., 220 of the 4 μs WUP 200 in the example of IEEE802.11; see FIG. 2), as illustrated by step 430.

The transmitted signal comprises a first signal part (e.g., a WUS such as an MC-OOK signal) extending over a first frequency interval (e.g., 13 center sub-carriers—approximately 4 MHz—in the example of IEEE802.11) within the frequency range, as illustrated by sub-step 431.

In a typical example, the first signal part represents an on-state of an on-off keying (OOK) modulation scheme (possibly using Manchester and/or repetition coding); e.g., of a multi-carrier on-off keying (MC-OOK) modulation scheme. In the terminology of IEEE802.11, the first signal part represents an "On symbol".

The transmitted signal comprises a second signal part extending over a second frequency interval (e.g., one or more sub-carriers other than the 13 center sub-carriers in the example of IEEE802.11) within the frequency range, as illustrated by sub-step 432. Generally, the first and second frequency intervals are non-overlapping.

The first signal part has a first autocorrelation value, and the second signal part is specifically constructed to provide a second autocorrelation value of the signal comprising the first and second signal parts, wherein the second autocorrelation value is lower than the first autocorrelation value. For example, the second signal part may have the exclusive purpose to provide the second autocorrelation value. Hence, the second signal part typically carries no information or data.

Thus, the second signal part may be seen as a de-correlating signal part purposed to lower the autocorrelation of the transmitted signal—as seen by a legacy receiver—compared to a situation where the transmitted did not comprise the second signal part (e.g., comprised only the first signal part).

Generally, an autocorrelation value may refer to any relevant autocorrelation value, e.g., a correlation peak value, that may trigger false detection. In the example of IEEE802.11, the autocorrelation value may relate to a peak value of a correlation between the transmitted signal and a copy of the transmitted signal delayed by 0.8 μs.

In some embodiments, the transmitted signal further comprises a third signal part extending over a third frequency interval (e.g., one or more sub-carriers other than the 13 center sub-carriers in the example of IEEE802.11) within the frequency range, as illustrated by optional sub-step 433. Generally, the first, second and third frequency intervals are non-overlapping. In a typical example, the first frequency interval is located between the second and third frequency intervals, as will be exemplified later herein (see, e.g., FIG. 8).

The third signal part is specifically constructed to provide a third autocorrelation value of the signal comprising the first, second, and third signal parts, wherein the third autocorrelation value is lower than the first autocorrelation value. In some embodiments, the third autocorrelation value is also lower than the second autocorrelation value. For example, the third signal part may have the exclusive purpose to provide the third autocorrelation value. Hence, the third signal part typically carries no information or data.

Thus, the third signal part may be seen as a de-correlating signal part purposed to lower the autocorrelation of the transmitted signal—as seen by a legacy receiver—compared to a situation where the transmitted did not comprise the third signal part (e.g., comprised only the first signal part, or comprised only the first and second signal parts).

It should be noted that addition of the second (and third) signal parts does not affect the WUR operation, since the WUR typically applies filtering for passing the first signal part and blocking other frequency intervals (e.g., those comprising the second and third signal parts).

Generally, a typical WUR may use signals received in the first frequency interval but not signals received in the second and/or third frequency intervals when detecting WUS, while a typical legacy receiver may use signals received in the first frequency interval as well as signals received in the second and/or third frequency intervals when detecting packets. Thus, the first frequency interval may be defined as a frequency interval used by both WUR and legacy receiver, while the second and/or third frequency interval may be defined as a frequency interval used by legacy receiver but not by WUR.

In some embodiments, the transmission of the signal comprises refraining from transmission in one or more frequency guard interval(s) between the first frequency interval and the second frequency interval and/or between the first frequency interval and the third frequency interval, as illustrated by optional sub-step 434.

Typically, the frequency guard interval may be provided directly adjacent to the first signal part (e.g., one or more sub-carriers adjacent to the 13 center sub-carriers in the example of IEEE802.11).

In some embodiments, the transmitted signal may further comprise one or more data signal parts extending over respective further frequency interval(s), as illustrated by optional sub-step 435. Generally, the first, second, third, and further frequency interval(s) are non-overlapping. Also generally, the further frequency interval(s) and any frequency guard interval(s) are non-overlapping. In some embodiments, frequency guard interval(s) may be provided between the first frequency interval and the further frequency interval(s).

The method 400 may also comprise generating the signal before transmission, as illustrated by optional step 420. Alternatively, the signal may be acquired in some other way (e.g., receiving the signal from an external signal generator).

When the frequency range is defined by a collection of sub-carriers for orthogonal frequency division multiplexing (OFDM) such as in the case of IEEE802.11, the first and second (and third, when applicable) frequency intervals are typically defined by respective first and second (and third, when applicable) sub-sets of the collection of sub-carriers as has been implied above.

In such embodiments, step 400 may comprise generating the signal for transmission using an inverse fast Fourier transform (IFFT).

A first digital signal may be provided at first inputs of the IFFT for generation of the first signal part, wherein the first inputs correspond to the first sub-set of sub-carriers (e.g., 13 center sub-carriers in the example of IEEE802.11).

A second digital signal may be provided at second inputs of the IFFT for generation of the second signal part, wherein the second inputs correspond to the second sub-set of sub-carriers.

When applicable, a third digital signal may be provided at third inputs of the IFFT for generation of the third signal part, wherein the third inputs correspond to the third sub-set of sub-carriers.

Frequency guard interval(s) may be provided within the signal by nulling inputs of the IFFT corresponding to sub-carriers for the frequency guard interval.

It should be noted that event though MC-OOK being generated using an IFFT as described above may be preferable in some scenarios, the signal generation of step 420 may be achieved in other ways.

For example, the "ON" signal used in the WUP may be determined off-line and stored in a look-up table. The look-up table may also comprise a corresponding de-correlating signal for each WUP. Alternatively, the de-correlating signal may be any random signal that is shifted in frequency such that its frequency contents do not overlap with the frequency contents of the WUP. In either case, the pre-determined WUP signal and the de-correlating signal be added, up-converted, and amplified in relation to the generation step 420.

In some embodiments, the signal transmission of step 430 is repeated for a plurality of time intervals (e.g., for each "ON" state of an on-off keying (OOK) modulation scheme) as illustrated by the loop-back from step 430, wherein an instantiation of the signal is transmitted for each repetition.

In such embodiments, the second (and third, when applicable) signal part may undergo a randomization procedure before transmission. The randomization procedure may decrease undesired spikes in frequency.

When referred to herein, the terminology "random", "randomly", "randomization", etc. is meant to include pseudo-random approaches as well as truly random approaches.

The randomization procedure may, for example, be part of the signal generation as illustrated in FIG. 4.

The randomization procedure may comprise randomly picking one of a first or second value (e.g., "1" or "−1") as illustrated by optional sub-step 421, and multiplying the second (and third) signal part by negative one when the second value is picked (to provide an instantiation of the signal for transmission) as illustrated by optional sub-step 422, and leave the second (and third) value unchanged otherwise.

More generally, the randomization procedure may comprise randomly picking a value from a collection of values, and multiplying the second (and third) signal part by the picked value to provide an instantiation of the signal for transmission. The values of the collection of values may be real values or complex values. In some examples, the collection of values have the same absolute value (e.g., 1). The random picking from the collection of values should, typically, provide a zero-mean distribution of the picked values. For example, randomly picking a value from a collection of values may comprise randomly picking a quaternary phase shift keying (QPSK) symbol.

As illustrated by optional step 410, the method 400 may also comprise acquiring the second (and third, when applicable) signal part. The second (and third) signal part is typically determined beforehand (by the device executing the method 400 or by a different device) and retrieved from a storing when the signal is to be transmitted, but it may be determined in association with the signal transmission in some embodiments.

The second (and third, when applicable) signal part is typically determined based on the first signal part, since it aims at reducing the autocorrelation of the signal for transmission of the first signal part.

Figure 5:
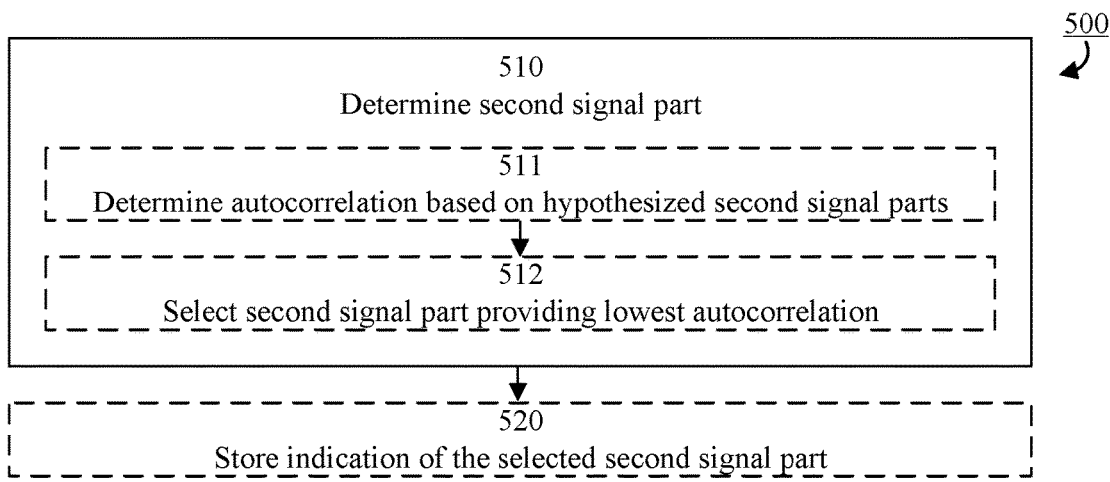
FIG. 5 is a flowchart illustrating example method steps according to some embodiments.

FIG. 5 illustrates an example method 500 for determining the second (and third, when applicable) signal part. The method 500 may, for example, be seen as an implementation of step 410 of FIG. 4.

In step 510, the second (and third) signal part is determined based on the first signal part, and in optional step 520, the determined second (and third) signal part, or an indication thereof (e.g., an index) is stored for later retrieval. Storing may, for example, be in the form of a look-up table mapping a first signal part to a corresponding second (and third) signal part.

In one approach, the second (and third) signal part may be determined by determining respective autocorrelation values for a plurality of hypothesized signals for candidate second (and third) signal parts as illustrated by optional sub-step 511, and selecting the candidate second signal part which is associated with the lowest determined respective autocorrelation value as illustrated by optional sub-step 512.

Each hypothesized signal comprises the first signal part and the candidate second (and third) signal part. Typically, each hypothesized signal corresponds to the signal for transmission when comprising the first signal part and the candidate second (and third) signal part.

In a typical example, the plurality of hypothesized signals relate to all possible second (and third) signal parts. Then, an exhaustive search may be performed to find the second (and third) signal part providing the lowest autocorrelation value.

Alternatively, an iterative search may be performed to find a second (and third) signal part acceptably low autocorrelation value (e.g., an autocorrelation value below a threshold value).

Yet alternatively, determining the de-correlating second/third signal part may comprise applying any randomizing signal over the second/third frequency interval.

Figure 6:
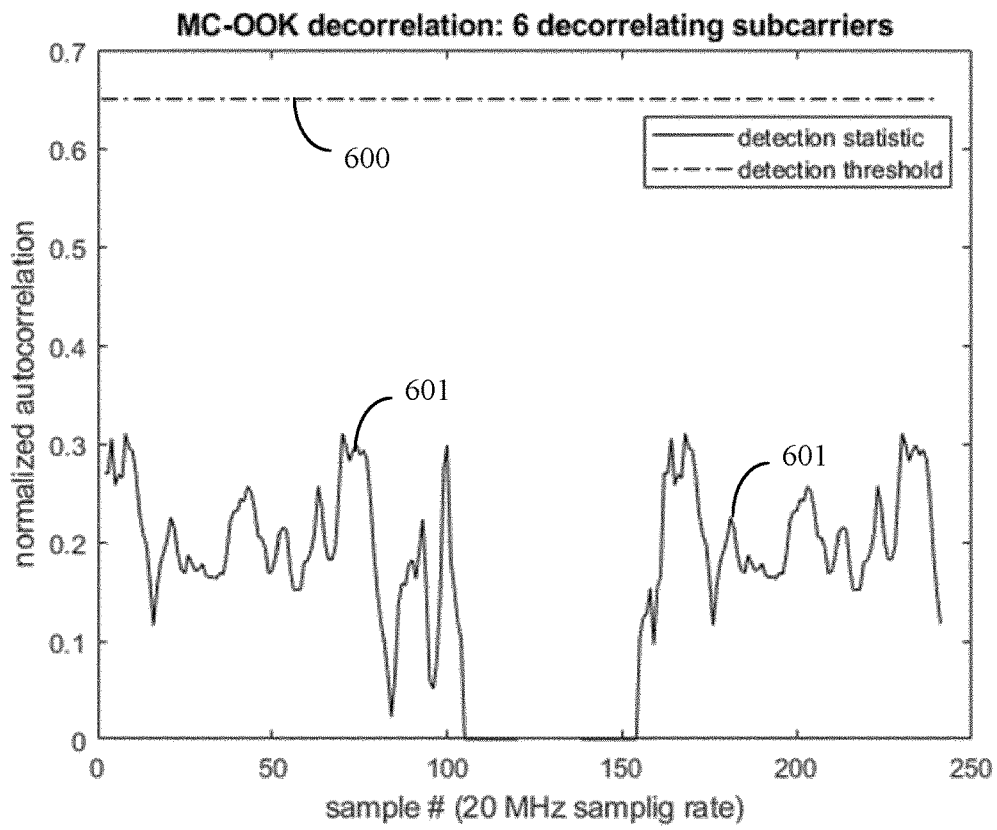
FIG. 6 is a simulation plot illustrating mitigation of false detection achieved by some embodiments.
Figure 7:
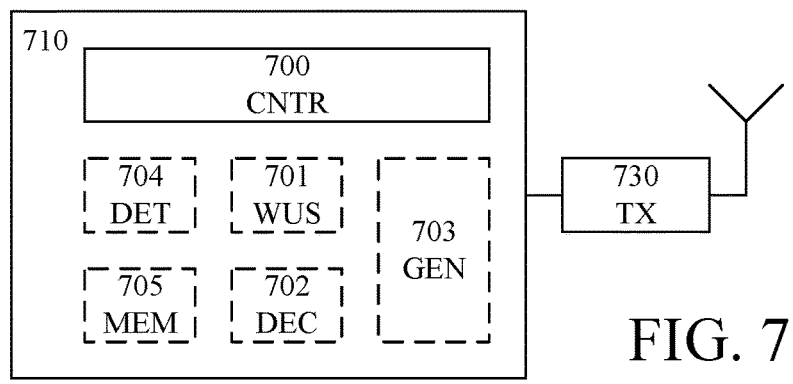
FIG. 7 is a schematic block diagram illustrating an example apparatus according to some embodiments.

FIG. 6 is a simulation plot showing normalized autocorrelation 601 for a WUP as a function of the WUP samples, when approaches according to some embodiments are applied for transmission of the WUP. More precisely, the simulation plot of FIG. 6 corresponds to that of FIG. 3, with the exception that second and third signal part have been applied for de-correlation of the first signal part (the actual WUS). It can be seen that a legacy receiver using the normalized autocorrelation 601 as detection statistic will not experience any false detection since the normalized autocorrelation 601 never exceeds the threshold value 600. FIG. 7 schematically illustrates an example apparatus 710 according to some embodiments. The example apparatus 710 may, for example, be comprised in a wireless transmitter and/or a communication device (e.g., a network node—such as a base station or an access point—or a user device—such as a user equipment, UE, or a station, STA). The example apparatus 710 may, for example, be configured to perform (or cause performance of) one or more of the method steps described in connection with FIGS. 4 and 5.

The apparatus comprises a controller (CNTR; e.g., control circuitry or a control module) 700. The controller is configured to cause transmission of a signal over a frequency range during a time interval (compare with step 430 of FIG. 4).

To this end, the controller may be associated with (e.g., operationally connected, or connectable, to) a transmitter (TX; e.g., transmission circuitry or a transmission module) 730. The transmitter 730 may be configured to transmit the signal over the frequency range during the time interval.

The transmission of the signal comprises transmission of a first signal part over a first frequency interval within the frequency range, and transmission of a second signal part over a second frequency interval within the frequency range, wherein the first and second frequency intervals are non-overlapping.

The first signal part has a first autocorrelation value, and the second signal part is specifically constructed to provide a second autocorrelation value of the signal comprising the first and second signal parts which is lower than the first autocorrelation value.

In some embodiments, the transmission of the signal also comprises transmission of a third signal part over a third frequency interval within the frequency range, wherein the first, second and third frequency intervals are non-overlapping, wherein the third signal part is specifically constructed to provide a third autocorrelation value of the signal comprising the first, second, and third signal parts which is lower than the first autocorrelation value.

The controller 700 may be further configured to cause generation of the signal for transmission (compare with step 420 of FIG. 4).

To this end, the controller may comprise or be otherwise associated with (e.g., operationally connected, or connectable, to) a generator (GEN; e.g., generation circuitry or a generation module) 703. The generator 703 may be configured to generate the signal for transmission based on the first signal part (WUS) 701 and the de-correlating, second (and third, when applicable), signal part (DEC) 702.

In some embodiments, the controller 700 is further configured to cause determination of the second (and third) signal part based on the first signal part (compare with step 410 of FIG. 4, and step 510 of FIG. 5).

To this end, the controller may comprise or be otherwise associated with (e.g., operationally connected, or connectable, to) a determiner (DET; e.g., determination circuitry or a determination module) 704. The determiner 704 may be configured to determine the second (and third) signal part based on the first signal part.

In some embodiments, the controller 700 is further configured to cause storing of the second (and third) signal part, or an indication thereof, for later retrieval (compare with step 520 of FIG. 5).

To this end, the controller may comprise or be otherwise associated with (e.g., operationally connected, or connectable, to) a memory (MEM; e.g., storing circuitry or a storing module) 705. The memory 705 may be configured to store the determined second (and third) signal part.

As mentioned before, the signal may be generated using an IFFT according to some embodiments. This is particularly suitable when the first signal part represents an on-state of a MC-OOK modulation scheme and the frequency range is defined by a collection of sub-carriers for OFDM, wherein the first/second/third frequency intervals are defined by respective non-overlapping sub-sets of the collection of sub-carriers.

Figure 8:
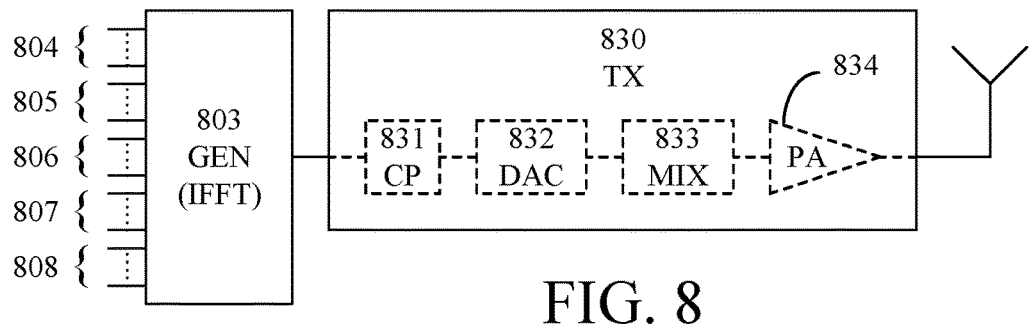
FIG. 8 is a schematic block diagram illustrating an example apparatus according to some embodiments.

FIG. 8 schematically illustrates an example apparatus for generating the signal for transmission. The apparatus comprises a signal generator (GEN) 803 implemented using an IFFT and a transmitter (TX) 830. The signal generator 803 may be seen as an example of the generator 703 of FIG. 7 and/or the transmitter 830 may be seen as an example of the transmitter 730 of FIG. 7.

In the example apparatus of FIG. 8, generation of the signal for transmission may comprise providing a first digital signal (compare with WUS 701 of FIG. 7) at first inputs 806 of the IFFT for generation of the first signal part, wherein the first inputs correspond to the sub-set of sub-carriers for the first signal part (e.g., 13 center frequencies for the example relating to IEEE802.11).

In the example apparatus of FIG. 8, generation of the signal for transmission may also comprise providing a second digital signal (compare with DEC 702 of FIG. 7) at second inputs 804 of the IFFT for generation of the second signal part, wherein the second inputs correspond to the sub-set of sub-carriers for the second signal part.

In the example apparatus of FIG. 8, generation of the signal for transmission may further comprise providing a third digital signal (compare with DEC 702 of FIG. 7) at third inputs 808 of the IFFT for generation of the third signal part, wherein the third inputs correspond to the sub-set of sub-carriers for the third signal part.

One or more frequency guard intervals may be provided by nulling one or more inputs 805, 807 of the IFFT.

The transmitter 830 may typically comprise a cyclic prefix prepender (CP) 831, a digital-to-analog converter (DAC) 832, a mixer (MIX) 833, and a power amplifier (PA) 834.

Some embodiments relate to a method to transmit a wake-up signal (first signal part), where MC-OOK is employed to generate the wake-up signal, and where the MC-OOK signal is multiplexed in the frequency domain with a second signal (second, and possibly third, signal parts) such that the second signal falls outside of the nominal channel bandwidth of the wake-up signal and such that the superposition of the wake-up signal and the second signal exhibits a lower autocorrelation peak value than the autocorrelation peak value of wake-up signal alone.

Typically, the only purpose of the second signal is to reduce the autocorrelation of the total signal (superposition of the wake-up signal and the second signal); i.e., the second signal does not carry any user data but is applied only to avoid (or reduce) false detections in legacy receivers.

The superposition of the MC-OOK signal and the second signal may be generated by means of an IFFT as described above (see, e.g., FIG. 8).

For example, generation of the MC-OOK may comprise using the 13 sub-carriers in the center of a corresponding IEEE802.11 OFDM spectrum to transmit the frequency domain symbols for conveying the WUS. Instead of nulling the remaining 51=64-13 sub-carriers in accordance with prior art approaches, some of these sub-carriers may be populated with frequency domain symbols such that the resulting OFDM symbol has a low autocorrelation, which results in a decrease (or complete cease) of false detections relating to the "ON" part of a MC-OOK WUP in legacy receivers considering the 20 MHz nominal bandwidth of an IEEE802.11 radio frequency channel. When the WUR uses a channel selective filter with a bandwidth of approximately 4 MHz, the WUR performance is preserved; i.e., not affected by the second (and third) signal parts.

Thus, in some embodiments, an OFDM symbol used to generate the "ON" part of an MC-OOK signal comprises two or more (e.g., three) types of frequency domain symbols:

First signal part (e.g., optimized symbols for low PAPR WUP; see the document IEEE 802.11-18/2000r1, "CR for Examples of WUR MC-OOK Symbol Design and CSD Design in Annex AB"; frequency domain symbols optimized to improve the performance of the WUP reception). This signal part typically comprises 13 symbols (e.g., modulated using binary phase shift keying, BPSK, quaternary phase shift keying, QPSK, 16/64/256-quadrature amplitude modulation, 16QAM, 64QAM, 256QAM, etc.) used to populate the 13 sub-carriers in the center of a 20 MHz radio frequency channel.

Second (and third) signal part (de-correlating symbols; chosen so that the resulting time domain OFDM signal has low autocorrelation). This signal part typically comprises symbols (e.g., modulated using BPSK, QPSK, 16/64/256-QAM, etc.) used to populate some of the remaining 51=64-13 sub-carriers.

Optionally zeros (null sub-carriers) may be applied to create a guard band between the sub-carriers of the first and second/third signal parts. A guard band may be beneficial to enable the WUR to properly filter out the energy from the de-correlating symbols.

For example, the first signal part may be provided by populating sub-carriers −6 to 6 (assuming the 64 sub-carriers are numbered from −32 to 31) with the BPSK symbols 1, 1, 1, −1, −1, −1, 0, −1, 1, −1, −1, 1, −1 (corresponding to example 1 in Table AB-2 in the document IEEE 802.11-18/2000r1, "CR for Examples of WUR MC-OOK Symbol Design and CSD Design in Annex AB"). This setting has been used for the plot in FIG. 3.

Then, de-correlation may be provided by populating sub-carriers 15 to 17 with the BPSK symbols 1, −1, −1, and sub-carriers −17 to −15 with the BPSK symbols 1, 1, 1 (i.e., using 6 de-correlating sub-carriers), and all other sub-carriers may be set to zero (i.e., using guard bands of more than 2 MHz between the first and de-correlating signal parts). This setting has been used for the plot in FIG. 6.

By allocating more sub-carriers to the set of de-correlating sub-carriers, further de-correlation may be obtained.

In some embodiments, some sub-carriers may be used to carry user data or other suitable information, which provides further de-correlation while increasing spectral efficiency.

It may, or may not, affect the selection of the number of de-correlating sub-carriers if there is a power constraint for the transmission.

For example, if there is a power spectral density (PSD) constraint (e.g., that the PSD must not exceed 10 dBm/MHz) it is possible to allocate power to the de-correlating sub-carriers without decreasing the power allocated to the 13 center sub-carriers conveying the WUP.

On the other hand, if there is a total power constraint (e.g., that the transmission power must not exceed 1 W) allocating power to de-correlating sub-carriers will be done at the expense of decreasing the power allocated to the 13 center sub-carriers conveying the WUP. Tuning may be applied to provide an acceptable trade-off between WUR performance (depending on power of the 13 center sub-carriers conveying the WUP) and false detection avoidance for legacy receivers (depending on the number of sub-carriers used for de-correlation).

Embodiments relating to approaches for a receiver at risk of experiencing false detections in association with a wake-up signal will now be exemplified. These embodiments are particularly suitable when it is possible to modify or update legacy IEEE802.11 receivers.

Figure 9:
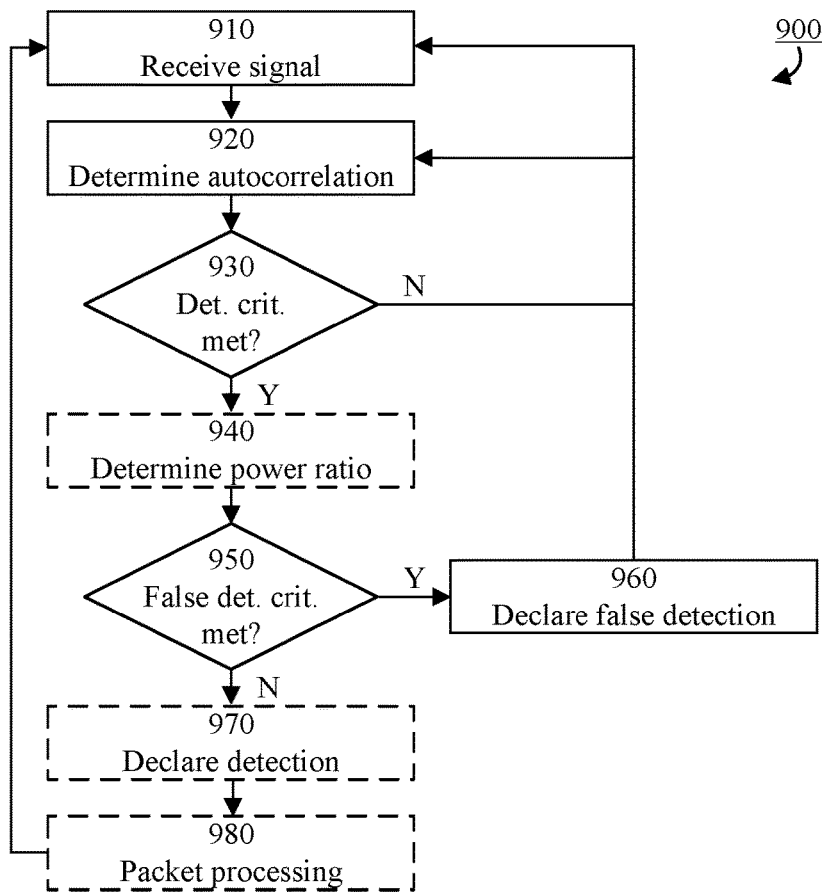
FIG. 9 is a flowchart illustrating example method steps according to some embodiments.

FIG. 9 illustrates an example method 900 for a wireless receiver according to some embodiments. The wireless receiver may be at risk of experiencing false detections in association with a wake-up signal (e.g., a legacy IEEE802.11 receiver).

Generally, the method comprises processing of a received signal which has been transmitted over a frequency range (e.g., 20 MHz in the example of IEEE802.11) during a time interval (e.g., the 4 μs WUP 200 in the example of IEEE802.11; see FIG. 2).

The received signal may represent an on-state of an on-off keying (OOK) modulation scheme (possibly using Manchester and/or repetition coding); e.g., of a multi-carrier on-off keying (MC-OOK) modulation scheme. In the terminology of IEEE802.11, the received signal represents an "On symbol".

In a typical example, the received signal is either a WUP or an ordinary OFDM packet. One purpose of the method 500 is to enable distinguishing between detection of an ordinary OFDM packet and false detection in relation to a WUP.

The method comprises receiving the signal over a frequency range during a time interval as illustrated in step 910, and determining an autocorrelation value for the received signal as illustrated in step 920.

Generally, an autocorrelation value may refer to any relevant autocorrelation value, e.g., a correlation peak value, used for detection. In the example of IEEE802.11, the autocorrelation value may relate to a peak value of a correlation between the received signal and a copy of the received signal delayed by 0.8 μs.

Figure 3:
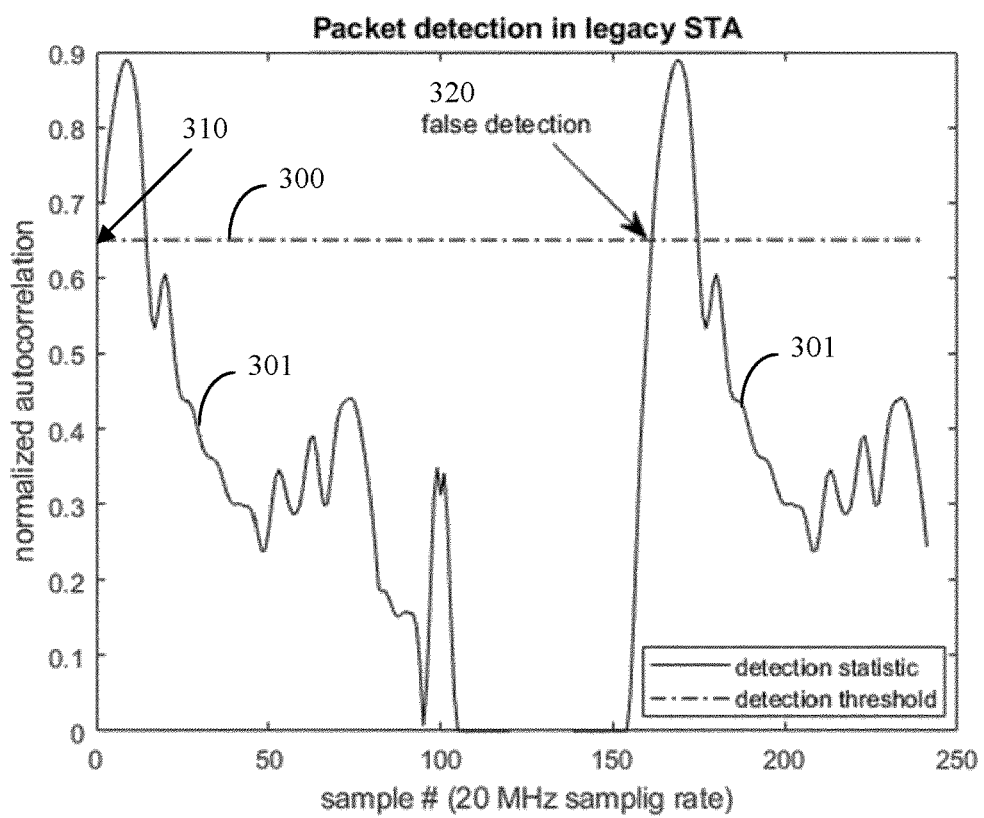
FIG. 3 is a simulation plot illustrating an example false detection event addressed by some embodiments.

In step 930, it is determined whether the autocorrelation value meets a detection criterion (compare with the thresholds 300 and 600 of FIGS. 3 and 6).

When the autocorrelation value does not meet the detection criterion (N-path out of step 930), no detection is registered and the method may return to step 910 for continued monitoring of received signals, or to step 920 for continued evaluation of the autocorrelation.

When the autocorrelation value does meet a detection criterion (Y-path out of step 930), it is determined, in step 950, whether a false detection criterion is met.

When the false detection criterion is met (Y-path out from step 950), it is determined that the registered detection was a false detection, which is declared in step 960, and the method may return to step 910 for continued monitoring of received signals, or to step 920 for continued evaluation of the autocorrelation.

When the false detection criterion is not met (N-path out from step 950), it is determined that the registered detection was a true detection, which is declared in optional step 970, and the method may continue to step 980 for processing (e.g., decoding) of the packet of the received signal.

Generally, when referred to herein, a false detection may, for example, be defined as an event wherein the autocorrelation passes a detection criterion (e.g., an autocorrelation peak value exceeding a threshold value; compare with 930) even though it does not stem from a packet indication, such as a start of a packet (e.g., does not stem from an L-STF; compare with 201 of FIG. 2).

Also generally, when referred to herein, a true detection may, for example, be defined as an event wherein the autocorrelation passes a detection criterion (e.g., an autocorrelation peak value exceeding a threshold value) and does indeed stem from a packet indication, such as a start of a packet (e.g., stems from an L-STF).

In some embodiments, step 960 may comprise other actions as well; e.g., refraining from transmission during some period of time, refraining from further attempts to process (e.g., decode) a packet of the received signal, refraining from re-setting a network allocation vector (NAV), etc. The network allocation vector is a virtual carrier sensing parameter. It is set when the legacy preamble in the WUS is (correctly) detected (e.g., in step 970), but should not be (erroneously) reset due to false detection.

The detection criterion of step 930 may comprise the autocorrelation value falling on a first side of a detection threshold. For example, the detection criterion of step 930 may comprise the autocorrelation value exceeding the detection threshold (compare with the thresholds 300 and 600 of FIGS. 3 and 6).

The false detection criterion of step 950 may, for example, be based on a frequency domain power ratio and/or on a time domain power ratio, which may be determined in optional step 940 and used in step 950.

An example of a suitable frequency domain power ratio is a ratio between power of the received signal in a first frequency interval within the frequency range and power of the received signal in the frequency range.

Then, the frequency domain power ratio should typically have a lower value if the received signal comprised an ordinary OFDM packet than if the received signal comprised a WUP.

Typically, the first frequency interval relates to, e.g., equals, a frequency interval over which a WUS packet is transmitted (e.g., 13 center sub-carriers—approximately 4 MHz—in the example of IEEE802.11) and the frequency range relates to, e.g., equals, a frequency range over which an ordinary OFDM packet is transmitted (e.g., 20 MHz in the example of IEEE802.11). Then, the frequency domain power ratio should be close to 0.2 if the received signal comprised an ordinary OFDM packet and should be close to 1 if the received signal comprised a WUP.

The false detection criterion of step 950 may comprise the frequency domain power ratio falling on a first side of a first false detection threshold. For example, the false detection criterion of step 950 may comprise the frequency domain power ratio exceeding the first false detection threshold.

The first false detection threshold may have any suitable value, e.g., any value between—such as the mean value of—the frequency domain power ratio for an ordinary OFDM packet and the frequency domain power ratio for a WUP. In the above example relating to IEEE802.11, the first false detection threshold may have any value between 0.2 and 1, wherein 0.6 may be particularly suitable.

An example of a suitable time domain power ratio is a ratio between power of the received signal in two directly subsequent time intervals. Then, when the two directly subsequent time intervals correspond to the duration of a Manchester coded symbol in an OOK modulated signal, the time domain power ratio should typically have a value close to 1 if the received signal comprised an ordinary OFDM packet, and a value which is substantially different from 1 (with an absolute value which is either very small or very large) if the received signal comprised a WUP.

The false detection criterion of step 950 may comprise the time domain power ratio falling on a first side of a second false detection threshold and on a second side of a third false detection threshold. For example, the false detection criterion of step 950 may comprise the time domain power ratio not falling between the second and third false detection thresholds.

The second and third false detection thresholds may have any suitable values, e.g., a value between 0 and 1 for the second false detection threshold—wherein 0.5 may be particularly suitable—and a value greater than 1 for the third false detection threshold—wherein 2 may be particularly suitable.

It should be noted that there are other, alternative or additional, ways to implement the false detection criterion of step 950. For example, determining whether the received signal has a bandwidth which is larger than the bandwidth of the WUS may be achieved by other types of spectral analysis than the one described above.

Figure 10:
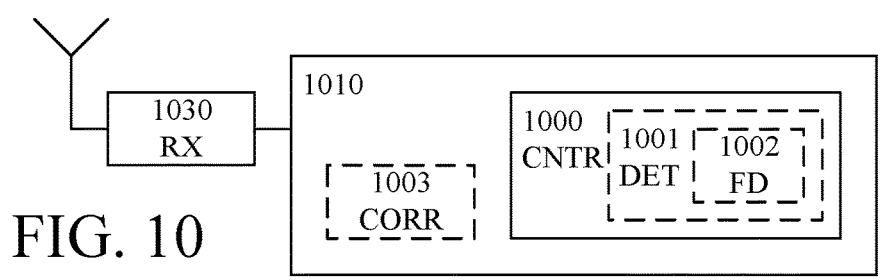
FIG. 10 is a schematic block diagram illustrating an example apparatus according to some embodiments.

FIG. 10 schematically illustrates an example apparatus 1010 according to some embodiments. The example apparatus 1010 may, for example, be comprised in a wireless receiver and/or a communication device (e.g., a network node—such as a base station or an access point—or a user device—such as a user equipment, UE, or a station, STA). The example apparatus 1010 may, for example, be configured to perform (or cause performance of) one or more of the method steps described in connection with FIG. 9.

The apparatus comprises a controller (CNTR; e.g., control circuitry or a control module) 1000.

The controller is configured to cause reception of a signal over a frequency range during a time interval (compare with step 910 of FIG. 9).

To this end, the controller may be associated with (e.g., operationally connected, or connectable, to) a receiver (RX; e.g., reception circuitry or a reception module) 1030. The receiver 1030 may be configured to receive the signal over the frequency range during the time interval.

The controller is also configured to cause determination of an autocorrelation value for the received signal (compare with step 920 of FIG. 9).

To this end, the controller may comprise or be otherwise associated with (e.g., operationally connected, or connectable, to) a correlator (CORR; e.g., correlation circuitry or a correlation module) 1003. The correlator 1003 may be configured to determine the autocorrelation value for the received signal.

The controller is also configured to cause—when the autocorrelation value meets a detection criterion—declaration of false detection when a false detection criterion is met (compare with step 960 of FIG. 9).

To this end, the controller may comprise, or be otherwise associated with (e.g., operationally connected, or connectable, to), a detector (DET; e.g., detection circuitry or a detection module) 1001 which may in turn comprise or be otherwise associated with a false detection determiner (FD) 1002. The detector 1001 may be configured to determine whether the autocorrelation value meets the detection criterion and the false detection determiner may be configured to determine whether the false detection criterion is met.

In some embodiments, the controller 1000 may be further configured to cause other actions as well; e.g., refraining from transmission during some period of time, refraining from further attempts to process (e.g., decode) a packet of the received signal, refraining from re-setting a network allocation vector (NAV), etc.

Some embodiments relate to a detection method comprising detecting the presence of a repetitive pattern (compare with steps 920 and 930 of FIG. 9) and determining whether the received signal has a bandwidth which is larger than the bandwidth of an MC-OOK signal; e.g., a WUS (compare with step 950 of FIG. 9).

Typically, either of the transmitter embodiments and the receiver embodiments provide reduced false detection due to WUP transmission. However, it should be noted that some transmitter embodiments may be combined with some receiver embodiments. For example, the transmission of the second (and third, when applicable) signal parts as described for the transmitter embodiments is, typically, perfectly compatible to using a time domain power ratio for determining false detections in the receiver embodiments.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a communication device (e.g., a user device or a network node).

Embodiments may appear within an electronic apparatus (such as a communication device) comprising arrangements, circuitry, and/or logic according to any of the embodiments described herein. Alternatively or additionally, an electronic apparatus (such as a communication device) may be configured to perform methods according to any of the embodiments described herein.

Figure 11:
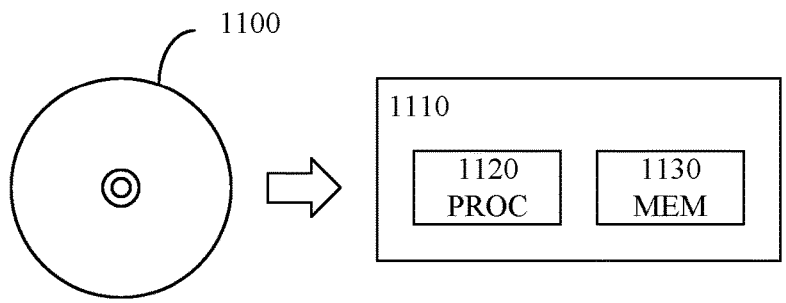
FIG. 11 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 11 illustrates an example computer readable medium in the form of a compact disc (CD) ROM 1100. The computer readable medium has stored thereon a computer program comprising program instructions. The computer program is loadable into a data processor (PROC; e.g., data processing circuitry or a data processing unit) 1120, which may, for example, be comprised in a communication device 1110. When loaded into the data processor, the computer program may be stored in a memory (MEM) 1130 associated with or comprised in the data processor. According to some embodiments, the computer program may, when loaded into and run by the data processor, cause execution of method steps according to, for example, any of the methods illustrated in FIGS. 4, 5, and 9, or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the intended scope.

For example, the method embodiments described herein discloses example methods through steps being performed in a certain order. However, it is recognized that these sequences of events may take place in another order without departing from the intended scope. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes.

Further insight may be gained from the following example titled "Study of False L-STF Detections Triggered by MC-OOK".

In IEEE 802.11 document 19-1016-06-00ba "Comments on TGba D3.0", it is stated that "STAs operating in non-WUR mode will often falsely detect an L-STF during the reception of the MC-OOK part of a WUR PPDU" and that "False detections can have a negative impact on the operation of the STAs".

In this example, the false detection problem in legacy STAs is studied and an alternative way to generate MC-OOK without impacting the performance of the WURs and/or without triggering false detections in other STAs is described.

A recap of L-STF Detection shows that the L-STF may consist of 10 repetitions of a 0.8 us short symbol, and that L-STF detection can be performed by correlating the received signal with a delayed version of itself, wherein a packet may be detected when the autocorrelation exceeds a threshold.

A recap of MC-OOK On symbol design shows that the use of random MC-OOK ON symbols may lead to degraded performance since the channel coding in the WUR PPDUs is typically very weak and many waveforms generate small eye diagram openings. Because of this, optimized waveforms are recommended in Annex AC of IEEE 802.11ba D3.0.

Figure 12:
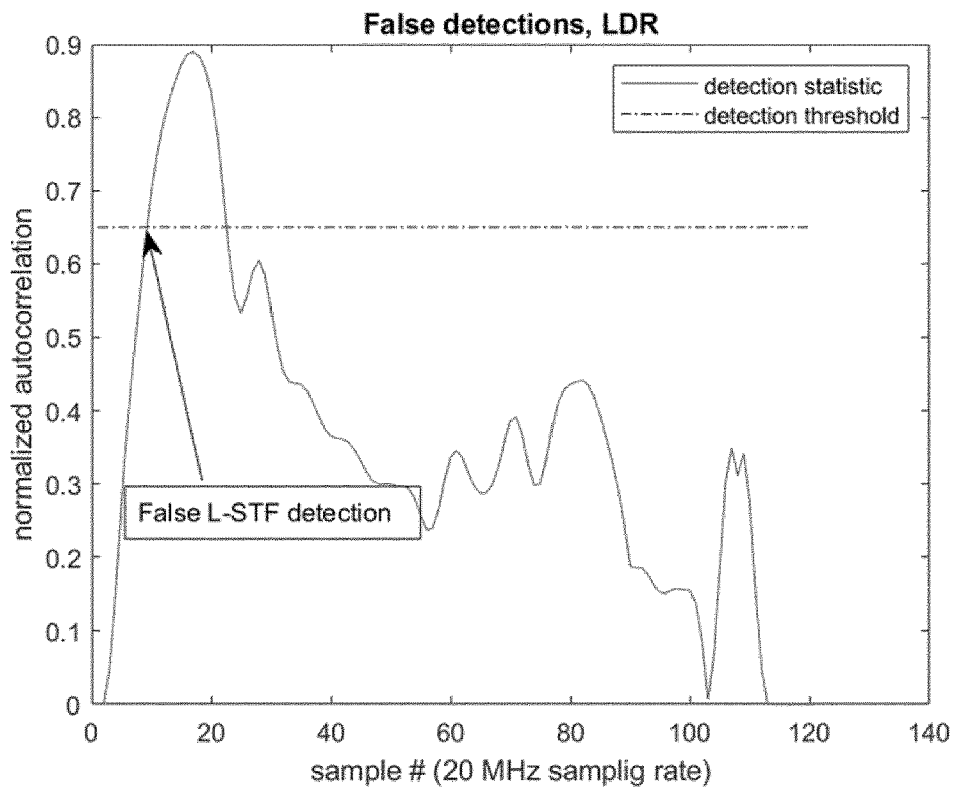
FIG. 12 is a simulation plot illustrating results achieved in relation to some embodiments.
Figure 13:
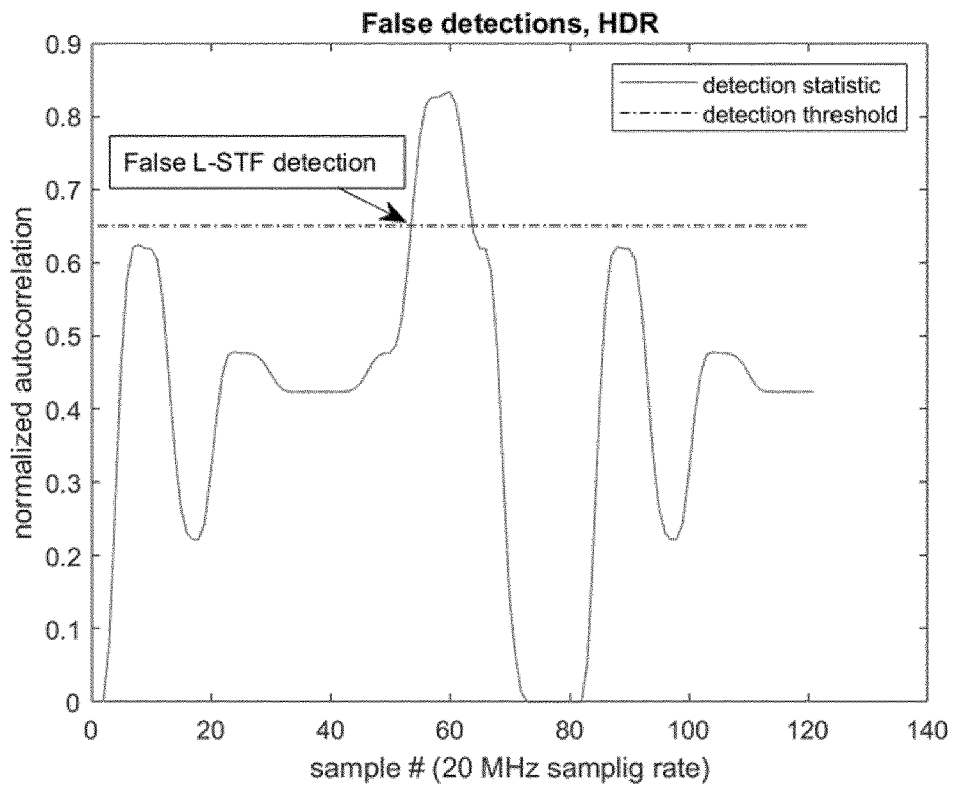
FIG. 13 is a simulation plot illustrating results achieved in relation to some embodiments.

In a study of the behavior of legacy 802.11a STAs, the following simulation settings were used:
 The packet detection algorithms implemented in a legacy 802.11a STA were utilized
 LDR: MC-OOK generated according to Example 1 in Annex AC of Draft 802.11ba D3.0
 HDR: MC-OOK generated according to Example 3 in Annex AC of Draft 802.11ba D3.0
 Noiseless WUR PPDU (high signal-to-noise ratio, SNR, is more challenging than low SNR)
The result of the simulation is illustrated in FIGS. 12 and 13. The possibility of recurrent false detections is confirmed.

An alternative MC-OOK generation (compare with FIG. 8) may be achieved by populating some of the muted subcarriers (de-correlating subcarriers) with de-correlating frequency domain symbols. These symbols may be symbols specifically designed to de-correlate the MC-OOK ON symbols (and their cyclically shifted versions generated by the symbol randomizer). A guard band may be left around the center 4 MHz.

In an example for LDR, Example 1 in Table AC2 of IEEE 802.11ba D3.0 may be used as MC-OOK ON symbol: $S_{-6:6} = S^{LDR} = \{1\ 1\ 1\ -1\ -1\ -1\ 0\ -1\ 1\ -1\ -1\ 1\ -1\}$ and de-correlating frequency domain symbols may be $S_{-17:-15,15:17} = \{1\ -1\ 1\ 1\ 1\ 1\}$.

Figure 14:
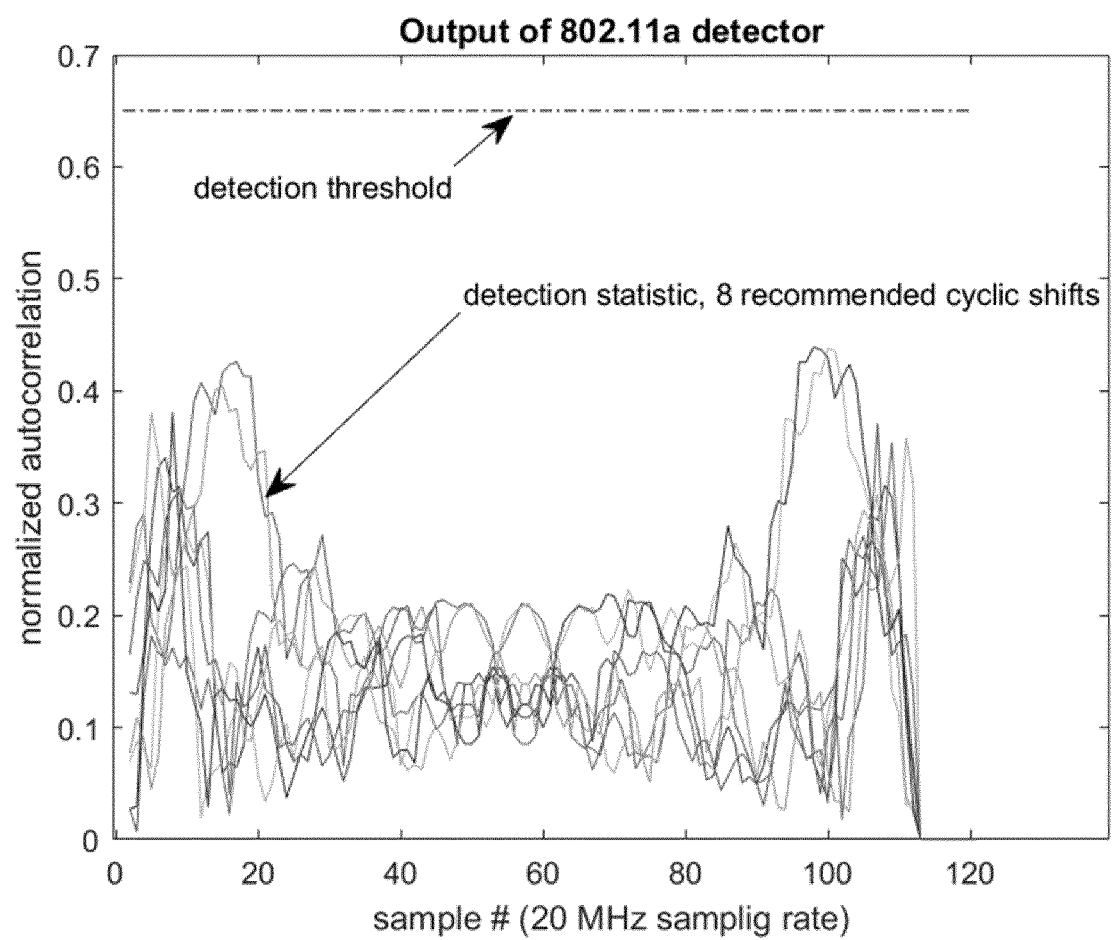
FIG. 14 is a simulation plot illustrating results achieved in relation to some embodiments.

The result of this simulation is illustrated in FIG. 14 for a number of realizations. The ON symbols generated by the symbol randomizer do not trigger false L-STF detections in this case.

Thus, in this example, an alternative approach to generate MC-OOK has been described. It employs so-called de-correlating subcarriers.

The channel selective filter, CSF, in the WURs filters out the de-correlating subcarriers. Thereby, the transmitter can avoid the use of MC-OOK waveforms that produce small eye diagram openings.

The CSF in STAs operating in non-WUR mode does not dampen the de-correlating subcarriers. Thus, the low autocorrelation MC-OOK waveform will avoid triggering a false L-STF detection.

In regulatory domains where there are limitations on the PSD, de-correlating subcarriers can be introduced without the need to decrease the power of the 4 MHz in the center of the RF channel.

The invention claimed is:

1. A method for a wireless transmitter, the method comprising:
 transmitting, during a time interval, a signal comprising first and second signal parts over a frequency range comprising non-overlapping first and second frequency intervals, wherein:
  the first signal part is transmitted in the first frequency interval and has a first autocorrelation value;
  the second signal part is transmitted in the second frequency interval; and
  the signal comprising the first and second signal parts has a second autocorrelation value that is lower than the first autocorrelation value.

2. The method of claim 1, wherein the second signal part decorrelates the signal comprising the first and second parts to provide the lower second autocorrelation value.

3. The method of claim 1, wherein one or more of the following applies:
 the first signal part is a wake-up signal (WUS); and
 the first signal part represents an on-state of an on-off keying (OOK) modulation scheme.

4. The method of claim 1, further comprising:
 determining respective autocorrelation values for a plurality of hypothesized signals, each hypothesized signal comprising the first signal part and a candidate second signal part; and
 selecting, as the second signal part, the candidate second signal part associated with the lowest determined respective autocorrelation value.

5. The method of claim 1, further comprising transmitting, during the time interval, a third signal part of the signal over a third frequency interval within the frequency range, wherein:
 the first, second, and third frequency intervals are non-overlapping,
 the first frequency interval is located between the second and third frequency intervals, and
 the signal comprising the first, second, and third signal parts has a third autocorrelation value that is lower than the first autocorrelation value.

6. The method of claim 1, further comprising refraining from transmitting, during the time interval, in a frequency guard interval between the first frequency interval and the second frequency interval.

7. The method of claim 1, further comprising, for each of a plurality of time intervals:
 randomly selecting a first or second value;
 multiplying the second signal part by negative one when the second value is selected; and
 transmitting an instantiation of the signal over the frequency range during the time interval.

8. The method of claim 1, wherein the first signal part represents an on-state of a multi-carrier on-off keying (MC-OOK) modulation scheme.

9. The method of claim 1, wherein:
 the frequency range is defined by sub-carriers for orthogonal frequency division multiplexing (OFDM); and
 the first and second frequency intervals are defined by respective first and second sub-sets of the sub-carriers.

10. The method of claim 9, further comprising generating the signal for transmission based on:
 generating the first signal part by applying a first digital signal to first inputs of an inverse fast Fourier transform (IFFT), wherein the first inputs correspond to the first sub-set of sub-carriers; and
 generating the second signal part by applying a second digital signal to second inputs of the IFFT, wherein the second inputs correspond to the second sub-set of sub-carriers.

11. A wireless transmitter comprising a controller, wherein the controller is configured to cause the wireless transmitter to:
 transmit, during a time interval, a signal comprising first and second signal parts over a frequency range comprising non-overlapping first and second frequency intervals, wherein:
  the first signal part is transmitted in the first frequency interval and has a first autocorrelation value;
  the second signal part is transmitted in the second frequency interval; and
  the signal comprising the first and second signal parts has a second autocorrelation value that is lower than the first autocorrelation value.

12. The wireless transmitter of claim 11, wherein the second signal part decorrelates the signal comprising the first and second parts to provide the lower second autocorrelation value.

13. The wireless transmitter of claim 11, wherein one or more of the following applies:
   the first signal part is a wake-up signal (WUS); and
   the first signal part represents an on-state of an on-off keying (OOK) modulation scheme.

14. The wireless transmitter of claim 11, wherein the controller is further configured to:
   determine respective autocorrelation values for a plurality of hypothesized signals, each hypothesized signal comprising the first signal part and a candidate second signal part; and
   select, as the second signal part, the candidate second signal part associated with the lowest determined respective autocorrelation value.

15. The wireless transmitter of claim 11, wherein the controller is further configured to cause the wireless transmitter to transmit, during the time interval, a third signal part of the signal over a third frequency interval within the frequency range, wherein:
   the first, second, and third frequency intervals are non-overlapping,
   the first frequency interval is located between the second and third frequency intervals, and
   the signal comprising the first, second, and third signal parts has a third autocorrelation value that is lower than the first autocorrelation value.

16. The wireless transmitter of claim 11, wherein the controller is further configured to cause the wireless transmitter to refrain from transmitting, during the time interval, in a frequency guard interval between the first frequency interval and the second frequency interval.

17. The wireless transmitter of claim 11, wherein the controller is further configured to, for each of a plurality of time intervals:
   randomly select a first or second value;
   multiply the second signal part by negative one when the second value is selected; and
   transmit an instantiation of the signal over the frequency range during the time interval.

18. The wireless transmitter of claim 11, wherein the first signal part represents an on-state of a multi-carrier on-off keying (MC-OOK) modulation scheme.

19. The wireless transmitter of claim 11, wherein:
   the frequency range is defined by sub-carriers for orthogonal frequency division multiplexing (OFDM); and
   the first and second frequency intervals are defined by respective first and second sub-sets of the sub-carriers.

20. The wireless transmitter of claim 19, the controller is further configured to generate the signal for transmission based on:
   generating the first signal part by applying a first digital signal to first inputs of an inverse fast Fourier transform (IFFT), wherein the first inputs correspond to the first sub-set of sub-carriers; and
   generating the second signal part by applying a second digital signal to second inputs of the IFFT, wherein the second inputs correspond to the second sub-set of sub-carriers.

21. A non-transitory computer readable medium having stored thereon a computer program comprising program instructions that, when executed by a controller, cause a wireless transmitter to:
   transmit, during a time interval, a signal comprising first and second signal parts over a frequency range comprising non-overlapping first and second frequency intervals, wherein:
   the first signal part is transmitted in the first frequency interval and has a first autocorrelation value;
   the second signal part is transmitted in the second frequency interval; and
   the signal comprising the first and second signal parts has a second autocorrelation value that is lower than the first autocorrelation value.

\* \* \* \* \*

UNITED STATES PATENT AND TRADEMARK OFFICE
CERTIFICATE OF CORRECTION

PATENT NO. : 11,778,560 B2
APPLICATION NO. : 17/619369
DATED : October 3, 2023
INVENTOR(S) : Lopez et al.

It is certified that error appears in the above-identified patent and that said Letters Patent is hereby corrected as shown below:

On the Title Page

In Item (57), under "ABSTRACT", in Column 2, Line 9, delete "auto-correlation" and insert -- autocorrelation --, therefor.

In Item (57), under "ABSTRACT", in Column 2, Line 12, delete "auto-correlation" and insert -- autocorrelation --, therefor.

In the Specification

In Column 1, Line 18, delete "be" and insert -- to be --, therefor.

In Column 1, Line 62, delete "IEEE802.11" and insert -- IEEE 802.11 --, therefor.

In Column 1, Line 67, delete "IEEE802.11" and insert -- IEEE 802.11 --, therefor.

In Column 2, Line 1, delete "IEEE802.11ba," and insert -- IEEE 802.11ba, --, therefor.

In Column 2, Line 4, delete "IEEE802.11ba" and insert -- IEEE 802.11ba --, therefor.

In Column 2, Line 8, delete "IEEE802.11ba," and insert -- IEEE 802.11ba, --, therefor.

In Column 2, Line 22, delete "IEEE802.11ba" and insert -- IEEE 802.11ba --, therefor.

In Column 2, Lines 25-26, delete "IEEE802.11a/g/n/ac." and insert -- IEEE 802.11a/g/n/ac. --, therefor.

In Column 2, Line 35, delete "IEEE802.11ba)" and insert -- IEEE 802.11ba) --, therefor.

In Column 2, Line 48, delete "IEEE802.11ba" and insert -- IEEE 802.11ba --, therefor.

Signed and Sealed this
Twenty-ninth Day of October, 2024

Katherine Kelly Vidal
*Director of the United States Patent and Trademark Office*

CERTIFICATE OF CORRECTION (continued)
U.S. Pat. No. 11,778,560 B2

In Column 2, Lines 55-56, delete "IEEE802.11a/g/n/ac," and insert -- IEEE 802.11a/g/n/ac, --, therefor.

In Column 3, Line 32, delete "IEEE802.11" and insert -- IEEE 802.11 --, therefor.

In Column 3, Line 34, delete "IEEE802.11a/g/n/ac;" and insert -- IEEE 802.11a/g/n/ac; --, therefor.

In Column 3, Line 37, delete "IEEE802.11" and insert -- IEEE 802.11 --, therefor.

In Column 3, Line 38, delete "IEEE802.11a/g/n/ac." and insert -- IEEE 802.11a/g/n/ac. --, therefor.

In Column 3, Line 47, delete "IEEE802.11ba" and insert -- IEEE 802.11ba --, therefor.

In Column 3, Line 63, delete "MC-OOK On" and insert -- MC-OOK ON --, therefor.

In Column 4, Line 14, delete "MC-OOK On" and insert -- MC-OOK ON --, therefor.

In Column 4, Line 29, delete "IEEE802.11" and insert -- IEEE 802.11 --, therefor.

In Column 4, Line 36, delete "IEEE802.11" and insert -- IEEE 802.11 --, therefor.

In Column 4, Line 38, delete "IEEE802.11" and insert -- IEEE 802.11 --, therefor.

In Column 4, Line 45, delete "IEEE802.11" and insert -- IEEE 802.11 --, therefor.

In Column 5, Line 2, delete "IEEE802.11ax," and insert -- IEEE 802.11ax, --, therefor.

In Column 5, Line 3, delete "IEEE802.11be" and insert -- IEEE 802.11be --, therefor.

In Column 5, Line 57, delete "interval" and insert -- interval. --, therefor.

In Column 9, Line 1, delete "IEEE802.11ba," and insert -- IEEE 802.11ba, --, therefor.

In Column 9, Line 17, delete "IEEE802.11" and insert -- IEEE 802.11 --, therefor.

In Column 9, Line 39, delete "IEEE802.11)" and insert -- IEEE 802.11) --, therefor.

In Column 9, Line 40, delete "IEEE802.11;" and insert -- IEEE 802.11; --, therefor.

In Column 9, Line 45, delete "IEEE802.11)" and insert -- IEEE 802.11) --, therefor.

In Column 9, Line 51, delete "IEEE802.11," and insert -- IEEE 802.11, --, therefor.

In Column 9, Line 56, delete "IEEE802.11)" and insert -- IEEE 802.11) --, therefor.

CERTIFICATE OF CORRECTION (continued)
U.S. Pat. No. 11,778,560 B2

In Column 10, Line 10, delete "IEEE802.11," and insert -- IEEE 802.11, --, therefor.

In Column 10, Line 16, delete "IEEE802.11)" and insert -- IEEE 802.11) --, therefor.

In Column 10, Line 63, delete "IEEE802.11)." and insert -- IEEE 802.11). --, therefor.

In Column 11, Line 13, delete "IEEE802.11," and insert -- IEEE 802.11, --, therefor.

In Column 11, Line 24, delete "IEEE802.11)." and insert -- IEEE 802.11). --, therefor.

In Column 11, Line 36, delete "event" and insert -- even --, therefor.

In Column 14, Line 31, delete "IEEE802.11)." and insert -- IEEE 802.11). --, therefor.

In Column 14, Line 48, delete "832)," and insert -- 832, --, therefor.

In Column 15, Line 3, delete "IEEE802.11" and insert -- IEEE 802.11 --, therefor.

In Column 15, Line 12, delete "IEEE802.11" and insert -- IEEE 802.11 --, therefor.

In Column 16, Line 19, delete "IEEE802.11" and insert -- IEEE 802.11 --, therefor.

In Column 16, Line 24, delete "IEEE802.11" and insert -- IEEE 802.11 --, therefor.

In Column 16, Line 27, delete "IEEE802.11)" and insert -- IEEE 802.11) --, therefor.

In Column 16, Line 29, delete "IEEE802.11;" and insert -- IEEE 802.11; --, therefor.

In Column 16, Line 34, delete "IEEE802.11," and insert -- IEEE 802.11, --, therefor.

In Column 16, Line 47, delete "IEEE802.11," and insert -- IEEE 802.11, --, therefor.

In Column 17, Line 49, delete "IEEE802.11)" and insert -- IEEE 802.11) --, therefor.

In Column 17, Line 52, delete "IEEE802.11)." and insert -- IEEE 802.11). --, therefor.

In Column 17, Line 65, delete "IEEE802.11," and insert -- IEEE 802.11, --, therefor.

In Column 18, Lines 63-64, delete "connectable, to)," and insert -- connectable to), --, therefor.

In Column 19, Line 16, delete "and" and insert -- or --, therefor.

In Column 20, Line 56, delete "0.8 us" and insert -- 0.8 μs --, therefor.

In Column 20, Line 61, delete "MC-OOK On" and insert -- MC-OOK ON --, therefor.

CERTIFICATE OF CORRECTION (continued)
U.S. Pat. No. 11,778,560 B2

In Column 21, Line 10, delete "SNR)" and insert -- SNR). --, therefor.

In Column 21, Line 23, delete "{1 1 1 –1 –1 –1 0 –1 1 –1 –1 1 –1}" and insert -- {1, 1, 1, –1, –1, –1, 0, –1, 1, –1, –1, 1, –1} --, therefor.

In Column 21, Line 25, delete "{1 –1 1 1 1 1}." and insert -- {1, –1, 1, 1, 1, 1}. --, therefor.